C. BARBIERI.
AUTOMATIC MEASURING DEVICE.
APPLICATION FILED APR. 17, 1916.
1,286,496.
Patented Dec. 3, 1918.
2 SHEETS—SHEET 2.
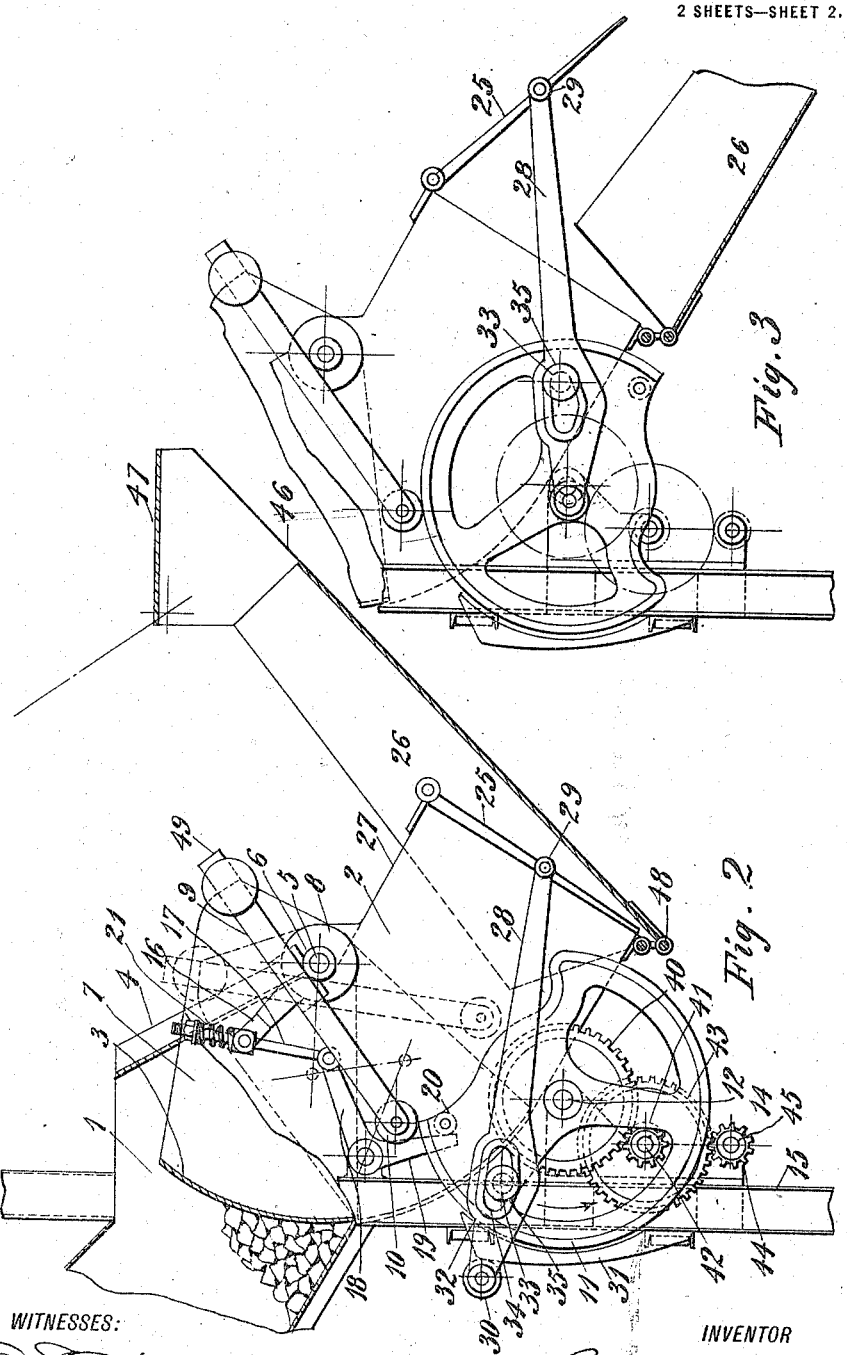
WITNESSES:
INVENTOR
Cesare Barbieri
BY
ATTORNEY

UNITED STATES PATENT OFFICE.

CESARE BARBIERI, OF CHICAGO, ILLINOIS.

AUTOMATIC MEASURING DEVICE.

1,286,496. Specification of Letters Patent. Patented Dec. 3, 1918.

Application filed April 17, 1916. Serial No. 91,608.

*To all whom it may concern:*

Be it known that I, CESARE BARBIERI, a subject of the King of Italy, residing at Chicago, in the county of Cook and State of Illinois, have invented certain new and useful Improvements in Automatic Measuring Devices, of which the following is a description.

My invention relates to mechanism for discharging material from a bin or other container and automatically measuring the quantity discharged.

The object of my invention is to provide a simple, strong, durable and accurate device of the kind described, adapted to discharge any desired number of accurately measured charges and to repeat the operation as often as required.

To this end my invention consists in the novel construction, arrangement and combiatio of parts herein shown and described, and more particularly pointed out in the claims.

In the accompanying drawings wherein like or similar reference characters indicate like or corresponding parts.

Fig. 2 is a section taken substantially on line 2—2 of Fig. 1.

Fig. 3 is a similar fragmentary section showing the parts with the discharge door open.

Figure 1:
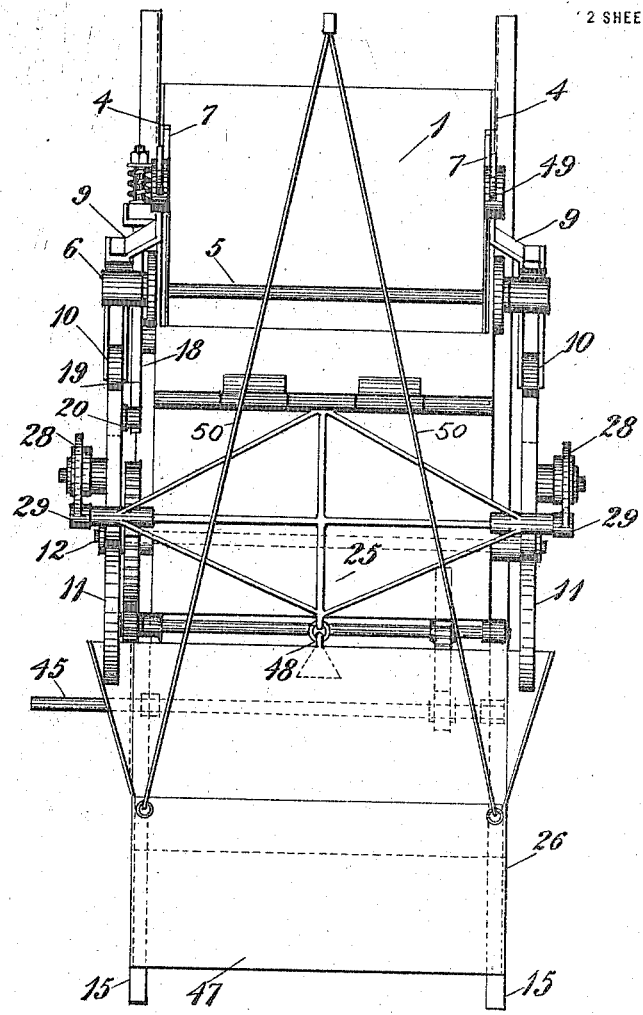
Figure 1 is a front elevation of my improved mechanism.

In the form shown in the drawings 1 is a discharge chute of a bin or container adapted for storing coal, broken stone or other material and 2 is an extension of said chute adapted to serve as a measuring chamber and separated from the chute 1 by a valve or gate 3 pivotally mounted upon suitably formed portions of the side walls 4 of the chute 1.

In the form shown a shaft 5 is rigidly mounted upon the side walls 4 of the chute and the gate 3 is provided with side walls 7 each pivotally secured to the shaft 5 by suitable bearings 6—6 or other convenient means for connecting the parts together.

Suitable means are also provided for controlling the position of the gate 3 and lowering and raising the same to open and close the chute to permit material in the chute 1 to pass into the measuring section 2. For this purpose an arm 9 is rigidly secured to each side wall 7 of the gate with the free end of the arm projecting beyond the shaft 5 and provided with a roller 10 or other suitable means adapted to coöperate with the periphery of a cam 11, rigidly secured to a suitable shaft 12 which is in turn mounted in suitable bearings 14 upon the pillars 15. The cam 11 is so formed that at each rotation the arm 9 will be operated to open and close the gate 3 and maintain the gate in closed position for any desired period.

Under ordinary circumstances the unbalanced weight of the gate 3 is sufficient to cause the gate to open by gravity as soon as the roller 10 escapes from the circular segment of the face of the cam. To guard against the possibility of the gate being held in its closed position by the pressure of the material in the chute or the jamming of the material against the face of the gate, I provide a second arm 16 upon each side wall 7 of the gate with a rod 17 pivotally attached to the free end of the arm to connect the same to the arm 18 of a bell crank 18—19 which is pivotally mounted upon the pillars 15. A roller 20 is provided at one side of the cam 11 near its periphery and the arm 19 of the bell crank 18—19 extends into the path of the roller 20 so that as the cam rotates in the direction indicated in the drawings the roller 20 will engage the face of the arm 19 thus rocking the bell crank and operating the arm 16 to open the gate.

In the preferred construction also, a spring 21 or other suitable resilient means is provided between the end of the arm 17 and the free end of the rod 16 to provide resiliency in the positive opening movement of the gate, and a weight 49 is provided upon the arm 9 adapted to be rigidly fixed in any desired position thereon to partially counterbalance the weight of the gate 3 to secure a more smooth operation of the parts.

A door 25 is provided at the discharge end of the measuring spaces 2 to close the same and prevent the escape of material therefrom when in its closed position. As shown the door 25 is pivotally attached at its upper side as at 26 to the upper wall or cover 27 of the chute. Any suitable mechanism may be provided for controlling the position of the door 25 and opening and closing the same to coöperate with the gate 3 so that material will be admitted to the measuring spaces 2 while the door 25 is closed after which the gate 3 will close and immediately thereafter the door 25 will open and permit the escape of the measured material the movements of the several parts being automatically repeated for each measure of material passing through the measuring space. In the form shown an arm 28 is pivotally attached to the door 25 as at 29 with its free end provided with a roller 30 adapted to coöperate with a fixed lock or cam 31 rigidly secured to the pillars 15 and so formed that when the roller 30 engages its upper face 32 the arm 28 will operate to draw the door 25 closed and maintain the same in its closed position until the roller 30 passes off at the lower end of the cam thus releasing the door and permitting it to swing open by gravity. In the preferred construction a pin 33 is secured to and projects from one side of the cam 11 and extends through a slot 34 in the arm for partially controlling the movements of the free end of the arm and thus operating the door 25. The slot 34 is preferably of sufficient length to permit of sufficient longitudinal movement of the arm in relation to the pin 33 to provide for the desired relative movement between the pin and arm. The several parts are however so formed that when the pin 33 engages the outer end of the slot 34 it will operate the arm to move the door toward the closed position, further rotation of the cam 11 brings the roller 30 into contact with the face 32 of the fixed cam 31 at the same time the pin 33 bearing against the inclined wall 35 of the slot 34 coöperates with the face 32 of the cam to move the free end of the arm downward and longitudinally thus closing the door, and locking the same while the continued movement of the pin 33 carries the roller 30 downward along the face of the cam 31 until it escapes past the lower end of the cam thus releasing the door and permitting it to open slightly and begin to discharge the contents of the measuring spaces. The continued movement of the cam 11 brings the pin 33 into contact with the inner end of the slot 34 thus forcing the door open and permitting a total discharge of the material, the several parts assuming the position shown in Fig. 3. A further rotation of the cam 11 first permits the door 25 to partially close by gravity after which the pin 33 engages the outer end of the slot 34 and the cycle of operations above described are repeated.

Any suitable means may be provided for rotating the shaft 12 and cam 11. As shown a suitable gear wheel 40 is rigidly secured to the shaft 12 and arranged to mesh with a pinion 41 upon a shaft 42 rotatably mounted in suitable bearings attached to the pillars 15. A gear 43 which is rigidly connected to the pinion 41 coöperates with a pinion 44 upon the shaft 45 which may be operated in any suitable manner as by a motor or other suitable driving mechanism (not shown). In the form shown also an extension 26 is provided at the lower end of the measuring spaces 2 and pivotally attached thereto for directing material discharged from the measuring spaces into the tender of a locomotive or other vehicle adapted to receive it. A plate or baffle 47 is preferably provided at the lower end of the extension adapted to prevent the scattering of the material escaping down the chute and to direct the material to the desired position upon the vehicle.

In the preferred form a single link 48 is pivotally attached to the bottom of the measuring space 2 and also pivotally secured to the upper end of the extension 26 and a pair of suspension members 50—50 are attached to the opposite sides of the free end of the extension thus permitting the free end of the extension to be moved a short distance laterally as well as vertically to direct material to the desired portion of the receiving bin and to avoid injury to the chute or extension in case the locomotive or other vehicle receiving the material from the chute moves slightly before the extension is entirely clear of the same.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described, a chute, a pair of valves comprising a gate and a door controlling the movement of material through said chute with a measuring space between said valves, in combination with a fixed shoulder, and an arm attached to said door adapted to coöperate with said shoulder to maintain said door in closed position, a rotatable member and means upon said member engaging said arm to control its position and move the same into and out of engagement with said shoulder.

2. In a device of the kind described, a chute, a pair of valves comprising a gate and a door controlling the movement of material through said chute with a measuring space between said valves, in combination with a fixed shoulder, and an arm pivotally attached to said door with its free end adapted to coöperate with said shoulder to maintain said door in closed position, a rotatable member and a crank pin upon said member engaging a slotted opening in said arm to control the position of its free end and to move the same into and out of engagement with the shoulder.

3. In a device of the kind described, a chute, a pair of valves comprising a gate and a door controlling the movement of material through said chute with a measuring space between said valves, in combination with a rotatable member and a fixed shoulder, mechanism connected to said door, and coöperating with said member and shoulder, to open and close the door and to positively lock the same in its closed position for a predetermined period, to permit the alternate filling and emptying of said measuring space.

4. In a device of the kind described, a chute, a pair of valves comprising a gate and a door controlling the movement of material through said chute with a measuring space between said valves, in combination with a rotatable member and a locking shoulder, mechanism connected to said gate and coöperating with said member for positively controlling the position of said gate and opening and closing the same, and means connected to said door and coöperating with said member and shoulder for positively controlling the position of said door, opening the same when said gate is closed and closing and positively locking the same in its closed position for a predetermined period while the gate is open, to permit the alternate filling and emptying of said measuring space.

5. In a device of the kind described, a chute a pair of valves comprising a gate and a door controlling the movement of material through said chute with a measuring space between said valve, in combination with a rotatable member and a locking shoulder, mechanism connected to said gate and periodically coöperating with said member for opening and closing said gate and maintaining the same in its closed position, and an arm connected to said door and provided with means adapted to coöperate with said shoulder to maintain said door in a closed position and a part upon said member loosely engaging said arm to control the movements of said arm and periodically engage said means with said shoulder to permit the alternate filling and emptying of said measuring space.

6. In a device of the kind described a pivotally mounted door, a rotatable member and an arm connecting said door and member whereby said door is automatically opened and closed at each rotation of said member, in combination with a laterally projecting part upon said arm and a fixed shoulder positioned in the path of said part and adapted to engage the same to maintain said door in closed position for a predetermined period at each rotation of said member.

7. In a device of the kind described, a pivotally mounted door, a rotatable member, a laterally projecting crank-pin mounted upon said member and an arm connecting said door and crank-pin whereby said door is automatically opened and closed at each rotation of said member, in combination with a laterally projecting part upon said arm and a fixed shoulder positioned in the path of said part and adapted to engage the same to maintain said door in closed position for a predetermined period at each rotation of said member.

8. In a device of the kind described, a pivotally mounted door, a rotatable member and an arm pivotally attached to said door near its free end and loosely engaging said member whereby said door is automatically opened and closed at each rotation of said member, in combination with a laterally projecting part upon said arm and a fixed shoulder positioned in the path of said part and adapted to engage the same to maintain said door in closed position for a predetermined period at each rotation of said member.

9. In a device of the kind described, a pivotally mounted door, a rotatable member and an arm connecting said door and member whereby said door is automatically opened and closed at each rotation of said member, in combination with a laterally projecting part upon the free end of said arm, and a fixed shoulder positioned in the path of said part and adapted to engage the same to maintain said door in closed position for a predetermined period at each rotation of said member.

10. In a device of the kind described, a pivotally mounted door, a rotatable member and an arm connecting said door and member whereby said door is automatically opened and closed at each rotation of said member, in combination with a laterally projecting part upon said arm and a fixed shoulder positioned in the path of said part and adapted to engage the same to hasten the closing of said door and thereafter maintain said door in closed position for a predetermined period at each rotation of said member.

11. In a device of the kind described, a pivotally mounted door, a rotatable member, a laterally projecting crank-pin mounted upon said member, and an arm pivotally attached to said door near its free end and loosely engaging said member whereby said door is automatically opened and closed at each rotation of said member, in combination with a laterally projecting part upon said arm and a fixed shoulder positioned in the path of said part and adapted to engage the same to hasten the closing of said door and thereafter maintain said door in closed position for a predetermined period at each rotation of said member.

12. In a device of the kind described, a pivotally mounted door, a rotatable member, a laterally projecting crank-pin mounted upon said member, and an arm pivotally attached to said door near its free end and loosely engaging said member whereby said door is automatically opened and closed at each rotation of said member, in combination with a laterally projecting part upon said arm and a fixed shoulder positioned in the path of said part and adapted to engage the same to maintain said door in closed position for a predetermined period at each rotation of said member.

13. In a device of the kind described, a chute, a pair of valves comprising a gate and a door controlling the movement of material through said chute with a measuring space between said valves, in combination with a positive locking means associated with the door to maintain the door in closed position, a rotatable member and means upon said member to actuate the locking means.

In testimony whereof I have hereunto signed my name in the presence of two subscribing witnesses.

CESARE BARBIERI.

Witnesses:
BLANCHE CHALMERS,
BURTON U. HILLS.

Copies of this patent may be obtained for five cents each, by addressing the "Commissioner of Patents, Washington, D. C."